(12) United States Patent
Chen

(10) Patent No.: US 10,859,176 B2
(45) Date of Patent: Dec. 8, 2020

(54) ELECTRIC VALVE AND CONTROL METHOD THEREFOR

(71) Applicants: Xiaoping Chen, Foshan (CN); FOSHAN VIOMI ELECTRICAL TECHNOLOGY CO., LTD., Foshan (CN)

(72) Inventor: Xiaoping Chen, Foshan (CN)

(73) Assignees: Xiaoping Chen, Guangdong (CN); Foshan Viomi Electrical Technology Co., Ltd., Guangdong (CN)

( * ) Notice: Subject to any disclaimer, the term of this patent is extended or adjusted under 35 U.S.C. 154(b) by 116 days.

(21) Appl. No.: 16/084,734

(22) PCT Filed: Mar. 13, 2017

(86) PCT No.: PCT/CN2017/076448
§ 371 (c)(1),
(2) Date: Sep. 13, 2018

(87) PCT Pub. No.: WO2017/162065
PCT Pub. Date: Sep. 28, 2017

(65) Prior Publication Data
US 2019/0072200 A1    Mar. 7, 2019

(30) Foreign Application Priority Data
Mar. 19, 2016  (CN) .......................... 2016 1 0163387

(51) Int. Cl.
*F16K 31/04*  (2006.01)
*F16K 37/00*  (2006.01)
*H02J 9/04*  (2006.01)

(52) U.S. Cl.
CPC ........ *F16K 31/041* (2013.01); *F16K 37/0025* (2013.01); *F16K 37/0041* (2013.01); *F16K 37/0083* (2013.01); *H02J 9/04* (2013.01)

(58) Field of Classification Search
CPC ...... F16K 31/041; F16K 31/04; F16K 31/047; F16K 31/046; F16K 37/0083; F16K 37/0041; F16K 37/0025; H02J 9/04
See application file for complete search history.

(56) References Cited

U.S. PATENT DOCUMENTS 4,423,364 A * 12/1983 Kompelien ............. H02P 23/24
318/107

* cited by examiner

*Primary Examiner* — Eric Keasel
(74) *Attorney, Agent, or Firm* — Rosenberg, Klein & Lee

(57) ABSTRACT

An electric valve and a control method therefor are disclosed. The electric valve comprises a mechanical valve body, a motor (1), a valve switch state detection apparatus, a control line (9) and a control circuit (80). The motor and the mechanical valve body are in transmission connection; the control line is electrically connected to the control circuit; the control circuit comprises a drive module (2) and a power supply module (5); and the motor, the valve switch state detection apparatus and the power supply module are respectively connected to the drive module. The control circuit further comprises a backup power supply (90) electrically connected thereto. Besides a power supply module which supplies power from the outside, the electric valve is additionally provided with a backup power supply; and after the power supply module has powered down, the backup power supply, in combination with a control circuit, can provide an operation power for the drive module and motor of the electric valve, thus automatically controlling the closing of the mechanical valve body.

9 Claims, 4 Drawing Sheets

ELECTRIC VALVE AND CONTROL METHOD THEREFOR

BACKGROUND OF THE INVENTION

Field of the Invention

The present invention relates to an electric valve, particularly to an electric valve and a control method therefor.

Description of the Related Art

Various water-related household electric appliances, such as water purifiers, laundry machines, dish washing machines, and water supply devices, are equipped with electromagnetic valves or electric valves. Among them, electromagnetic valves have poor dirt-proof ability. While used in a piping system free of filtration, an electromagnetic valve is likely to suffer leakage. Contrarily, electric valves have better dirt-proof ability and thus widely apply to water piping systems free of filtration. The conventional electric valve normally comprises a mechanical valve and a motor driving the mechanical valve to rotate.

There is an existing electric valve, which comprises a mechanical ball valve, a direct current (DC) motor, and a gear set coupling a rotation shaft of the mechanical ball valve to a rotation shaft of the DC motor. While the valve is intended to be opened, a DC voltage is supplied to the DC motor to enable the DC motor to rotate and drive the mechanical valve to open. While the valve is intended to be closed, a reverse DC voltage is supplied to the DC motor to enable the DC motor to rotate reversely and drive the mechanical ball valve to close.

Once power is interrupted in an opened state of the electric valve, the electric valve is unlikely to close automatically. Thus, the water piping system is not turned off but kept opened.

SUMMARY OF THE INVENTION

The primary objective of the present invention is to overcome the deficiencies of the conventional technology and provide an electric valve having a simple and rational structure and able to close in power shutdown and a control method therefor.

In order to achieve the objectives of the present invention, the present invention proposes an electric valve, which comprises a mechanical valve body, a motor, a valve switch state detection apparatus, a control line and a control circuit. The motor and the mechanical valve body are in transmission connection. The control line is electrically connected to the control circuit. The control circuit includes a drive module and a power supply module. The motor, the valve switch state detection apparatus and the power supply module are respectively connected to the drive module. The present invention is characterized in that the control circuit further comprises a backup power supply electrically connected thereto. After the power supply module has powered down, the backup power supply can provide an operation power for the drive module and the motor of the electric valve, whereby the motor can execute the instruction of the drive module to close the mechanical valve body automatically.

The objectives of the present invention may be further realized by the technical measures involved in the embodiments described below.

In one embodiment, the power supply module and the backup power supply are parallel to each other.

In one embodiment, the backup power supply is a capacitor or a battery. The backup power supply is to be used in the instant that the power supply module powers down. The capacitor or the battery needn't have too high an electricity storage as long as the electricity storage is sufficient to completely close the mechanical valve body from an open state.

In one embodiment, the power supply module further comprises a charge circuit for charging the backup power supply. As soon as the electric valve is powered on, the charge circuit charges the backup power supply. As mentioned above, the backup power supply needn't have too high an electricity storage. Therefore, in a very short period of time after power-on, the charge circuit will charge the backup power supply to a full-power state. Once the power is shut down, the backup power supply can operate instantly.

In one embodiment, the control line is electrically connected to the drive module; the power supply module further comprises an output end electrically connected to the drive module and an input end connected to power supply cables.

In one embodiment, the valve switch state detection apparatus further comprises an opened-state limit switch and a closed-state limit switch, wherein the opened-state limit switch is disposed in a position where the mechanical valve body is completely opened and electrically connected to the drive module, and wherein the closed-state limit switch is disposed in a position where the mechanical valve body is completely closed and electrically connected to the drive module. While the mechanical valve body is completely opened, the opened-state limit switch is triggered to operate. While the mechanical valve body is completely closed, the closed-state limit switch is triggered to operate. In another embodiment, the valve switch state detection apparatus is a current detection device, which detects the current of forward rotation and reverse rotation of the motor to determine whether the mechanical valve body is opened or closed.

In one embodiment, each of the opened-state limit switch and the closed-state limit switch is a microswitch, a sensory switch, or a photoelectric switch.

In one embodiment, the mechanical valve body and the motor are in transmission connection through a gear set; the gear set is integrated with or independent from the motor.

In one embodiment, the control line and the power supply cables are disposed inside a water-proof sleeve; water-proof connectors are used in the control line and the power supply cables. As the electric valve is used in a water piping system, the water-proof processing for electric-conduction lines and electronic devices will decrease the probability of current leakage, protect the electric valve against moisture, and prolong the service life of the electric valve.

In one embodiment, the electric valve further comprises a piping system and an electric box. The piping system includes a water inlet and a controlled water outlet. The mechanical vale body is disposed between the water inlet and the controlled water outlet. The electric box is disposed in the piping system. The motor, the valve switch state detection apparatus, and the control circuit are disposed inside the electric box. In another embodiment, the piping system has non-controlled water outlets. Via distributing a portion of water coining from the water inlet to the non-controlled water outlets, the electric valve of the present invention may have a wider range of application.

The present invention also proposes a control method for the electric valve, which is characterized in that if power is interrupted while the electric valve is in a power-on state, the power supply module stops supplying power to the drive module, and the default setting makes the control line to input a valve-closing signal to the drive module; at the same time, the backup power supply is automatically switched to supply power to the drive module, and the drive module drives the motor to rotate toward a direction of closing the mechanical valve body until the valve switch state detection apparatus detects that the mechanical valve body is completely closed; then the drive module receives a switch signal from the valve switch state detection apparatus and stops driving the motor; thus the mechanical valve body is kept in a closed state.

While power is turned on, the default setting demands that the control line controls the mechanical valve body to close, and the control circuit controls the motor to rotate the mechanical valve body toward a closing direction. At the same time, the power supply module charges the backup power supply. While the valve switch state detection apparatus detects that the mechanical valve body has been rotated to a closed position, the drive module receives a switch signal and stops driving the motor. Thus, the mechanical valve body is kept in a closed state. While the mechanical valve body is intended to open, the control line inputs a valve-opening signal to the drive module, and the drive module drives the motor to rotate reversely and make the mechanical valve body rotate toward an opened direction. While the valve switch state detection apparatus detects that the mechanical valve body has been rotated to an opened position, the drive module receives a switch signal and stops driving the motor. Thus, the mechanical valve body is kept in an opened state.

The present invention has the flowing advantages:
(1) In addition to the power supply module powered by an external power source, the electric valve of the present invention further has a backup power supply. While the power supply module stops supplying power, the backup power supply, in cooperation with the control circuit, provides working power for the drive module and the motor to automatically close the mechanical valve body.
(2) The electric valve of the present invention is applicable to many electric devices, including various water-related household electric appliances, such as water purifiers, laundry machines, and dish-washing machines.

DETAILED DESCRIPTION OF THE INVENTION

Below, embodiments are described in detail in cooperation with the attached drawings to further demonstrate the present invention.

Figure 1:
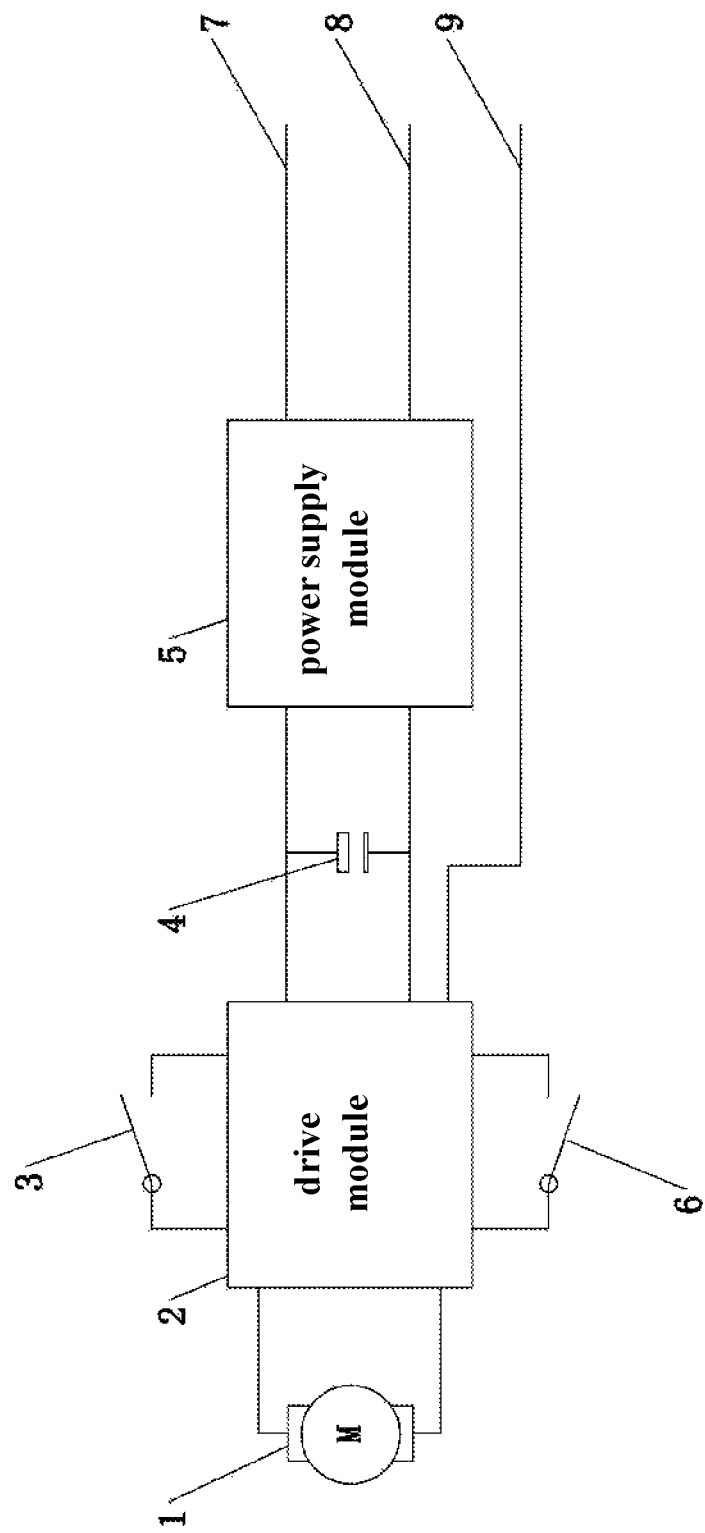
FIG. 1 is a diagram schematically showing a circuit of an electric valve according to one embodiment of the present invention.
Figure 2:
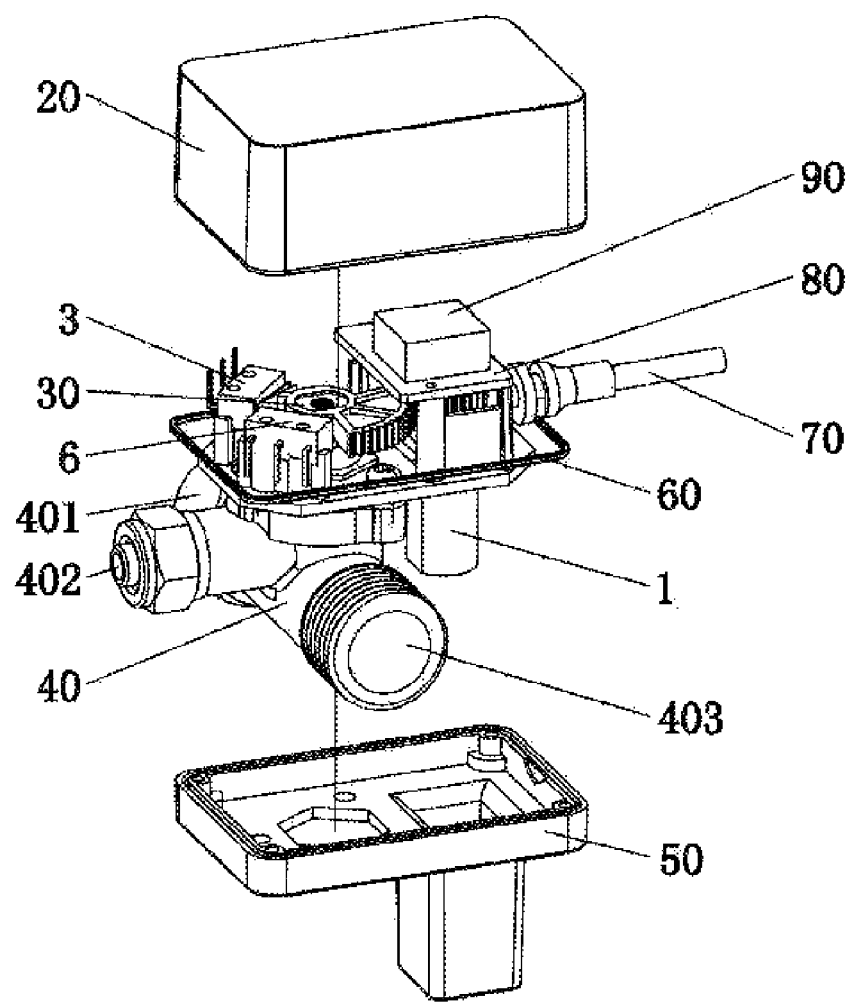
FIG. 2 is an exploded view schematically showing the structure of an electric valve according to one embodiment of the present invention.
Figure 3:
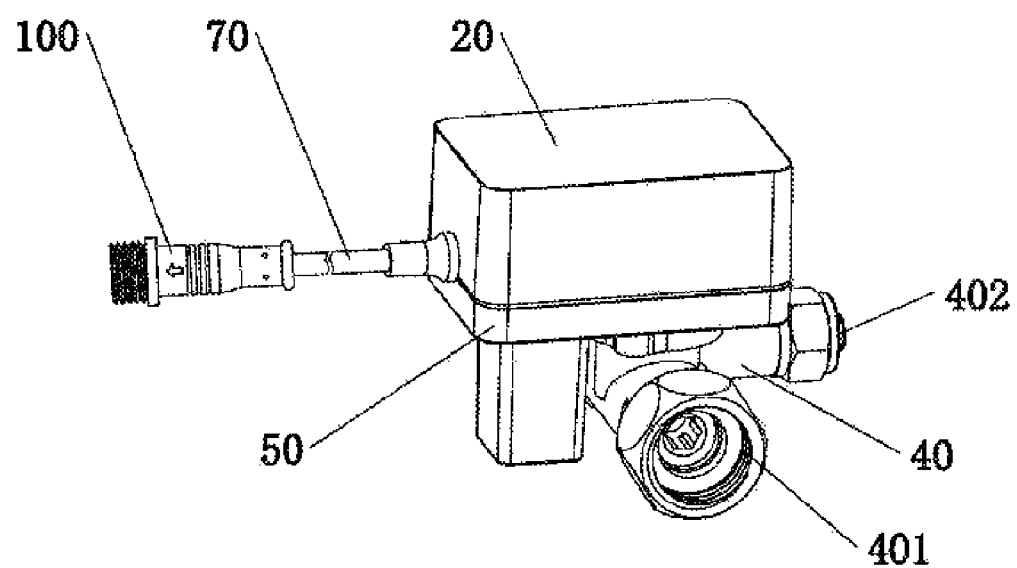
FIG. 3 is a perspective view schematically showing the structure of an electric valve according to one embodiment of the present invention.

Refer to FIGS. 1-3 for a first embodiment of the present invention. The electric valve of the present invention comprises a mechanical valve body, a motor 1, a valve switch state detection apparatus, a control line 9 and a control circuit 80. The motor 1 and the mechanical valve body are in transmission connection. The control line 9 is electrically connected to the control circuit 80. The control circuit 80 includes a drive module 2 and a power supply module 5. The motor 1, the valve switch state detection apparatus and the power supply module 5 are respectively connected to the drive module 2. The control circuit 80 further comprises a backup power supply 90 electrically connected thereto.

In one embodiment, the power supply module 5 and the backup power supply 90 are parallel to each other.

In one embodiment, the backup power supply 90 is a capacitor 4.

In one embodiment, the power supply module 5 has a charge circuit for charging the backup power supply 90.

In one embodiment, the control line 9 is electrically connected to the drive module 2; the power supply module 5 has an output end and an input end; the output end is electrically connected to the drive module 2, and the input end is connected to power supply cables 7 and 8.

In one embodiment, the valve switch state detection apparatus further comprises an opened-state limit switch 3 and a closed-state limit switch 6; the opened-state limit switch 3 is disposed in a position where the mechanical valve body is completely opened and electrically connected to the drive module 2; the closed-state limit switch 6 is disposed in a position where the mechanical valve body is completely closed and electrically connected to the drive module 2.

In one embodiment, each of the opened-state limit switch 3 and the closed-state limit switch 6 is a microswitch, a sensory switch, or a photoelectric switch.

In one embodiment, the mechanical valve body and the motor 1 are in transmission connection through a gear set 30; the gear set 30 is integrated with or independent from the motor 1.

In one embodiment, the control line 9 and the power supply cables 7 and 8 are disposed inside a water-proof sleeve 70; water-proof connectors 100 are used in the control line 9 and the power supply cables land 8.

In one embodiment, the electric valve further comprises a piping system 40 and an electric box. The piping system 40 includes a water inlet 401 and a controlled water outlet 402. The mechanical vale body is disposed between the water inlet 401 and the controlled water outlet 402. The electric box is disposed in the piping system 40. The motor 1, the valve switch state detection apparatus, and the control circuit 80 are disposed inside the electric box. In the embodiment shown in FIGS. 1-3, the piping system 40 is a T tube and further has a non-controlled water outlet 403. The non-controlled water outlet 403 directly interconnects with the water inlet 301. The controlled water outlet 402 is controlled by the mechanical valve body. While the mechanical valve body is opened, the controlled water outlet 402 interconnects with the water inlet 401. While the mechanical valve body is closed, the controlled water outlet 402 does not interconnect with the water inlet 401. The electric box includes a top cover 20, a support bracket 60, and a bottom cover 50. The support bracket 60 is fixedly coupled to the piping system 40. The motor 1, the valve switch state detection apparatus and the control circuit 80 are disposed on the support bracket 60. The top cover 20 and the bottom cover 50 are respectively disposed on the upper side and the lower side of the support bracket 60.

The present invention also proposes a control method for the electric valve, wherein if power is interrupted while the electric valve is in a power-on state, the power supply module 5 stops supplying power to the drive module 2, and the default setting makes the control line 9 to input a valve-closing signal to the drive module 2; at the same time, the backup power supply 90 is automatically switched to supply power to the drive module 2, and the drive module 2 drives the motor 1 to rotate toward a direction of closing the mechanical valve body until the valve switch state detection apparatus detects that the mechanical valve body is completely closed; then the drive module 2 receives a switch signal from the valve switch state detection apparatus and stops driving the motor 1; thus the mechanical valve body is kept in a closed state.

While power is turned on, the default setting demands that the control line 9 controls the mechanical valve body to close, and the control circuit 80 controls the motor 1 to rotate the mechanical valve body toward a closing direction. At the same time, the power supply module 5 charges the backup power supply 90. While the valve switch state detection apparatus detects that the mechanical valve body has been rotated to a closed position, the drive module 2 receives a switch signal and stops driving the motor 1. Thus, the mechanical valve body is kept in a closed state. While the mechanical valve body is intended to open, the control line 9 inputs a valve-opening signal to the drive module 2, and the drive module 2 drives the motor 1 to rotate reversely and make the mechanical valve body rotate toward an opening direction. While the valve switch state detection apparatus detects that the mechanical valve body has been rotated to an opened position, the drive module 2 receives a switch signal and stops driving the motor 1. Thus, the mechanical valve body is kept in an opened state.

Figure 4:
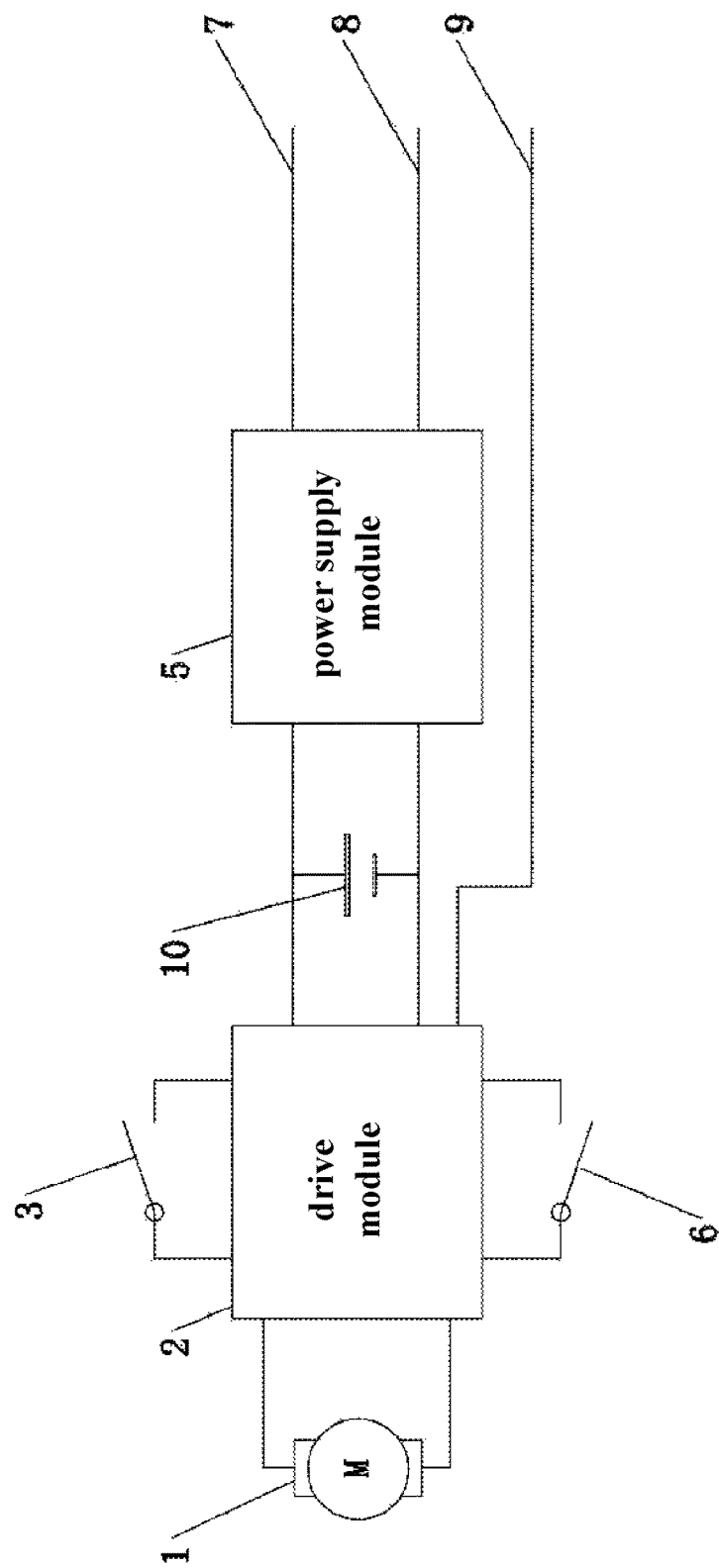
FIG. 4 is a diagram schematically showing a circuit of an electric valve according to another embodiment of the present invention.

Refer to FIG. 4 for a second embodiment of the present invention. The second embodiment is different from the first embodiment in that the backup power supply 90 is a battery 10 in the second embodiment.

What is claimed is:

1. An electric valve comprising a mechanical valve body, a motor (1), a valve switch state detection apparatus, a control line (9) and a control circuit (80), wherein the motor (1) and the mechanical valve body are in transmission connection; the control line (9) is electrically connected to the control circuit (80); the control circuit (80) further comprises a drive module (2) and a power supply module (5); the motor (1), the valve switch state detection apparatus and the power supply module (5) are respectively connected to the drive module (2), and wherein the electric valve is characterized in that the control circuit (80) further comprises a backup power supply (90) electrically connected thereto;

wherein while the power is interrupted during operation, the power supply module (5) stops supplying power to the drive module (2), and the control line (9) outputs an electric-valve closing signal to the drive module (2) according to a default setting; at the same time, the backup power supply (90) is automatically switched to supply power to the drive module (2), thereby controlling the motor (1) to drive the mechanical valve body to rotate toward a closing direction; once the valve switch state detection apparatus detects that the mechanical valve body is completely closed, the drive module (2) receives a switching signal from the valve switch state detection apparatus and stops driving the motor (1) to keep the mechanical valve body in a closed state.

2. The electric valve according to claim 1, characterized in that the power supply module (5) and the backup power supply (90) are parallel to each other.

3. The electric valve according to claim 1, characterized in that the backup power supply (90) is a capacitor (4) or a battery (10).

4. The electric valve according to claim 3, characterized in that the power supply module (5) further comprises a charge circuit for charging the backup power supply (90).

5. The electric valve according to claim 1, characterized in that the control line (9) is electrically connected to the drive module (2) and that the power supply module (5) further comprises an output end electrically connected to the drive module (2) and an input end connected to power supply cables (7, 8).

6. The electric valve according to claim 1, characterized in that the valve switch state detection apparatus further comprises an opened-state limit switch (3) and a closed-state limit switch (6), wherein the opened-state limit switch (3) is disposed in a position where the mechanical valve body is completely opened, and is electrically connected to the drive module (2); the closed-state limit switch (6) is disposed in a position where the mechanical valve body is completely closed, and is electrically connected to the drive module (2).

7. The electric valve according to claim 6, characterized in that each of opened-state limit switch (3) and the closed-state limit switch (6) is a microswitch, a sensory switch, or a photoelectric switch.

8. The electric valve according to claim 1, characterized in that the mechanical valve body and the motor (1) are in transmission connection through a gear set (30), wherein the gear set (30) is integrated with or independent from the motor (1).

9. The electric valve according to claim 1, wherein in a default setting for a power-up state, the control line (9) controls the mechanical valve body to close, and the control circuit (80) controls the motor (1) to rotate the mechanical valve body toward a closing direction, and the power supply module (5) charges the backup supply (90) at the same time;

while the valve switch state detection apparatus detects that the mechanical valve body is rotated to a closed position, the drive module (2) receives a switching signal and stops driving the motor (1) to keep the mechanical valve body in a closed state;

while the mechanical valve body is intended to be opened, the control line (9) receives a valve-opening signal, and the drive module (2) drives the motor (1) to rotate in a reverse direction to rotate the mechanical valve body toward an opening direction;

once the valve switch state detection apparatus detects that the mechanical valve body is rotated to an opened position, the drive module (2) receives a switching signal and stops driving the motor (1) to keep the mechanical valve body in an opened state.

* * * * *